(12) United States Patent
Tsai et al.

(10) Patent No.: US 7,377,693 B2
(45) Date of Patent: May 27, 2008

(54) STEEL WIRE RETAINER FOR A SLIDING BLOCK

(75) Inventors: Chiung-Hui Tsai, Taichung (TW); En-Chieh Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 290 days.

(21) Appl. No.: 11/307,826

(22) Filed: Feb. 24, 2006

(65) Prior Publication Data

US 2007/0201776 A1    Aug. 30, 2007

(51) Int. Cl.
*F16C 29/06* (2006.01)
(52) U.S. Cl. .......................................... 384/45; 384/43
(58) Field of Classification Search ............. 384/43–45
See application file for complete search history.

(56) References Cited

U.S. PATENT DOCUMENTS

| | | | |
|---|---|---|---|
| 4,253,709 A * | 3/1981 | Teramachi | 384/45 |
| 4,749,284 A * | 6/1988 | Teramachi | 384/45 |
| 5,429,439 A * | 7/1995 | Hsu et al. | 384/45 |
| 6,200,031 B1 * | 3/2001 | Faulhaber et al. | 384/45 |
| 6,210,040 B1 * | 4/2001 | Mischler | 384/45 |
| 6,558,039 B2 * | 5/2003 | Wu | 384/45 |
| 2006/0098903 A1 * | 5/2006 | Wang et al. | 384/45 |

* cited by examiner

*Primary Examiner*—Thomas R Hannon
(74) *Attorney, Agent, or Firm*—Banger Shia

(57) ABSTRACT

A steel wire retainer for a sliding block comprises a plurality of steel wire retaining members, each of which includes a locking section on the sliding block and a plurality of steel wire retaining members. The steel wire retaining members each has a hook formed on the retaining portion thereof for hooking the locking section of the sliding block. The restraining portion of the respective steel wire retaining members will cooperate with the rolling grooves of the sliding block to form a ball rolling path, and the restraining portion of the respective steel wire retaining members is formed with a plurality of reinforced folding portions. The simple, low cost and easily assembled steel wire retaining members have sufficient support strength and are suitable for various sized sliding blocks and can make the linear transmission apparatus operate stably.

10 Claims, 6 Drawing Sheets

STEEL WIRE RETAINER FOR A SLIDING BLOCK

BACKGROUND OF THE INVENTION

1. Field of the Invention

The present invention relates to a retainer used in a sliding block of a linear guideway, and more particularly to a simple, low cost and easily assembled steel wire retainer for a sliding block, which has high quality and can meet the market's requirement.

2. Description of the Prior Art

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved. Retainers in the sliding block of a linear guideway generally include metal board type retainer and embedded type plastic retainer, which are described as follows:

Metal Board Type

With reference to FIGS. 1 and 2, which show the metal board type retainers disclosed by U.S. Pat. Nos. 4,253,709 and 4,747,284, both of these two patents disclose a metal retaining board that is disposed between the sliding board and the rail. The metal retaining board is made by pressing and folding process. The metal board 12 as disclosed in U.S. Pat. No. 4,253,709 is fixed on the inner surface of the sliding block 10 by screws 141 and is adapted to retain a plurality of ball grooves 14 at a time, and the metal board 12 is shaped for mating with the rail 11. However, this metal board is impractical because of the following reasons:

First, the metal board 12 is made by pressing and folding process, accordingly its production cost is relatively high.

Second, the metal board 12 is fixed on the inner surface of the sliding block 10 by screws 141, the metal board 12 must be processed to form threaded holes, and this will complicate the assembly process.

Third, loading balls 142 in the respective ball grooves 14 or adjusting the balls 142 therein requires the user to assemble and disassemble the metal board 12 repeatedly by rotating the screws 141, therefore, the efficiency of balls loading or adjusting is very low.

Fourth, the metal board 12 is likely to produce noise when the balls 142 roll on it, and the impact of the balls 142 on the metal board 12 will aggravate the noise. To overcome the abovementioned assembly problems, U.S. Pat. No. 4,749,284 discloses another type product, wherein a plurality of metal retaining boards 15 are partially embedded in the sliding block 10 for mating with the respective ball grooves 14, and the metal retaining boards 15 are used to retain the balls 142, enabling the balls 142 to abut against the rail 11. Although the retaining boards 15 are modified to be positioned in an embedded manner, and this can substantially reduce the complexity of assembly and adjustment, it still has the following problems:

First, the metal retaining boards 15 should be processed with pressing and folding, the quantity of the metal retaining boards 15 is comparatively large, and it has to make the to-be-embedded portion whose angle is very difficult to make, therefore, the production cost of these metal retaining boards 15 is relatively high.

Second, the metal boards 15 may produce noise when the balls 142 roll on it, and the noise will be aggravated by the impact of the balls 142 on the metal boards 15.

Embedded Type Plastic Retainer

Another product that can overcome the noise and the production cost problems appears on the market, as shown in FIG. 3, wherein a plurality of plastic boards 18 are embedded during the assembly of the sliding block 16 and the end caps 17 and are used to prevent the disengagement of the balls out of the balls groove. Although the plastic boards 18 are made by plastic injection molding and it can simplify the production and effectively reduce the noise, the plastic board still has the problems as follows:

First, the plastic boards 18 can't provide sufficient support strength and must cooperate with the sliding block 16 and the end caps 17, since the plastic boards 18 are embedded between the sliding block and the end caps 17, such arrangement will increase the complexity of balls loading and adjusting.

Second, the plastic board is susceptible to deformation when it is subjected to temperature changes and erosive work surrounding, furthermore, the deformation of the plastic board will interfere with the operation of the balls.

To solve the aforementioned problems, the inventor of this invention, on the basis of the accumulated experience and skills associated with the linear transmission field, develops a brand new steel wire retainer for a sliding block that is free of influence from the factors, such as material, assembly and strength.

SUMMARY OF THE INVENTION

The primary objective of the present invention is to provide a simply structured and low cost steel wire retainer for a sliding block.

The steel wire retainer for a sliding block in accordance with the present invention includes a locking section on the sliding block and a plurality of steel wire retaining members. The steel wire of the retainer only needs to be folded to form a mid restraining portion, two retaining portions formed at both sides thereof, a hook and a reinforced folding portion, then the hook of the retaining portion can hook the locking section of the sliding block, therefore, the steel wire retainer of the present invention is simply structured, low cost and easily assembled.

Another objective of the present invention is to provide a steel wire retainer for a sliding block that has sufficient support strength and is suitable for various sized sliding blocks and can make the linear transmission apparatus operate stably.

The restraining portion of the steer wire retainer cooperates with the rolling grooves of the sliding block to form a ball rolling path, and the restraining portion of the respective steel wire retaining members is formed with a plurality of reinforced folding portions. The reinforced folding portions can enable the steel wire retainer to effectively counteract the disengaging force of the rolling balls, ensuring that the steel wire retaining member of the retainer will not be deformed when it is subjected to an exterior force, thus preventing interference with the operation of the balls.

The number of the reinforced folding portion formed on the restraining portion of the steel wire retaining member varies with the length of the rolling grooves. The restraining portion of the steel wire retaining member is formed by two parallel steel wires that abut against the balls. Basically, each of the parallel steel wires should be formed with reinforced folding portions, however, the number, the location and the corresponding relation of the reinforced folding portions are unnecessarily limited by the present invention, and should not be considered as a limitation to the invention.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
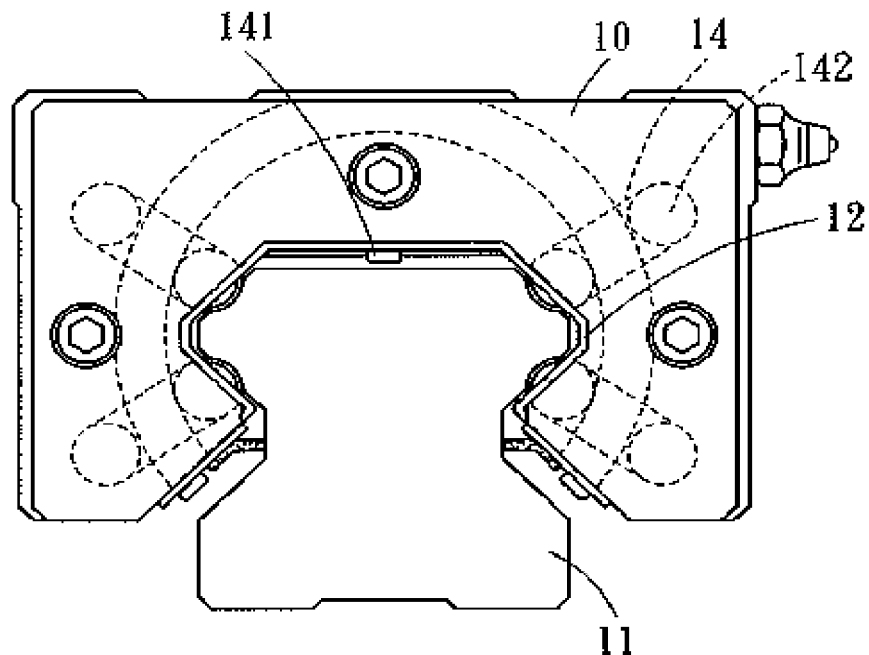
FIG. 1 is a perspective view of a sliding block retainer disclosed in U.S. Pat. No. 4,253,709.
Figure 2:
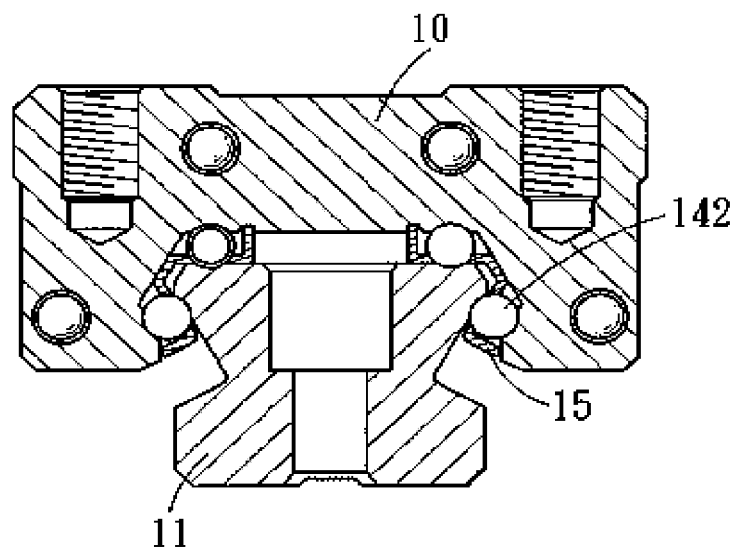
FIG. 2 is a cross sectional view of a sliding block retainer disclosed in U.S. Pat. No. 4,749,284.
Figure 3:
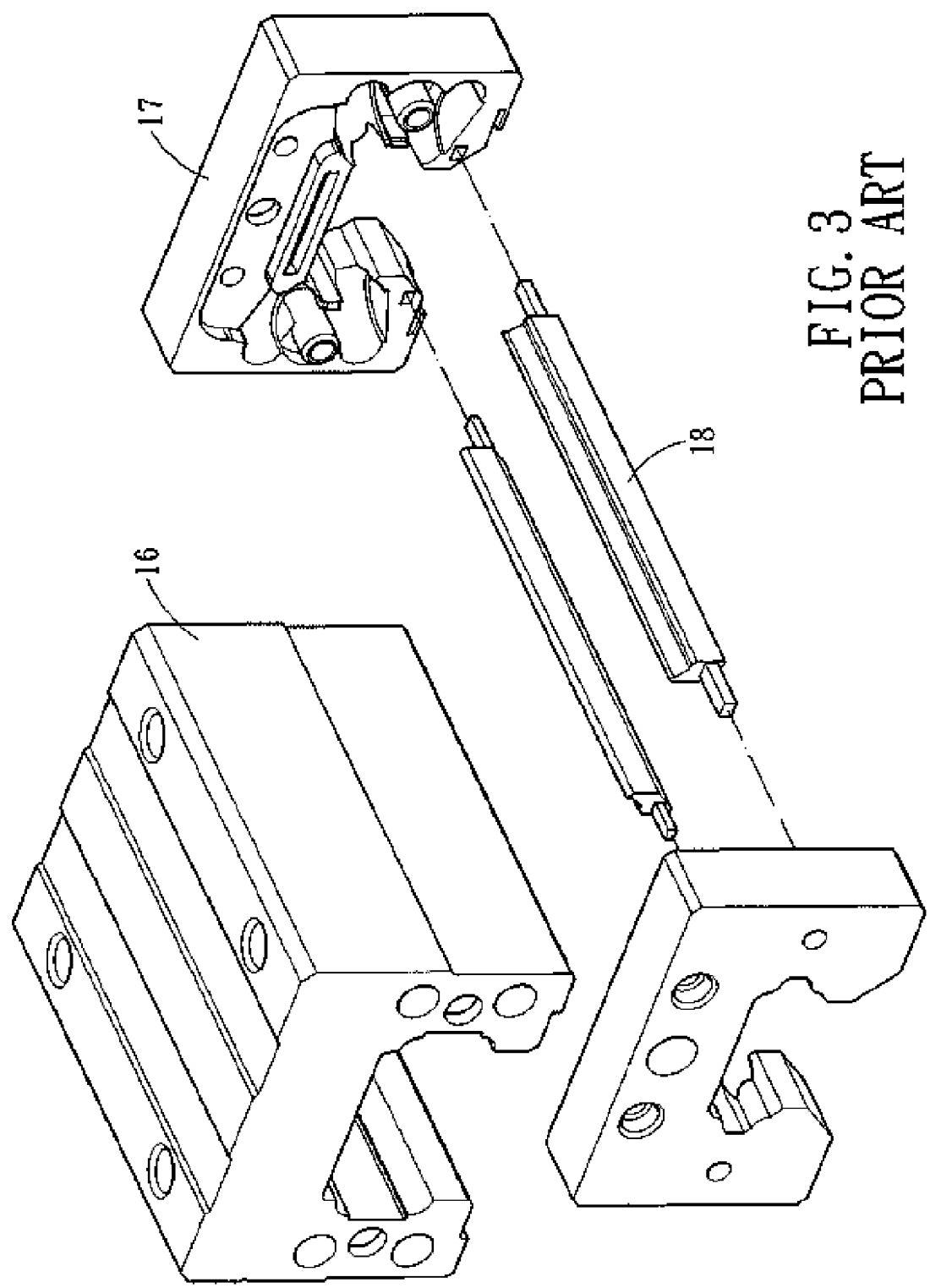
FIG. 3 is an exploded view of another conventional retainer used in a sliding block.
Figure 4:
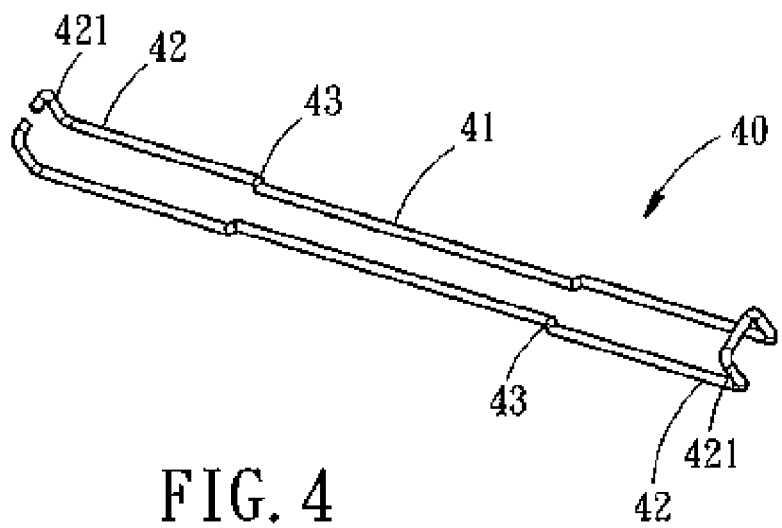
FIG. 4 is a perspective view of a steel wire retaining member of a sliding block in accordance with the present invention.
Figure 5:
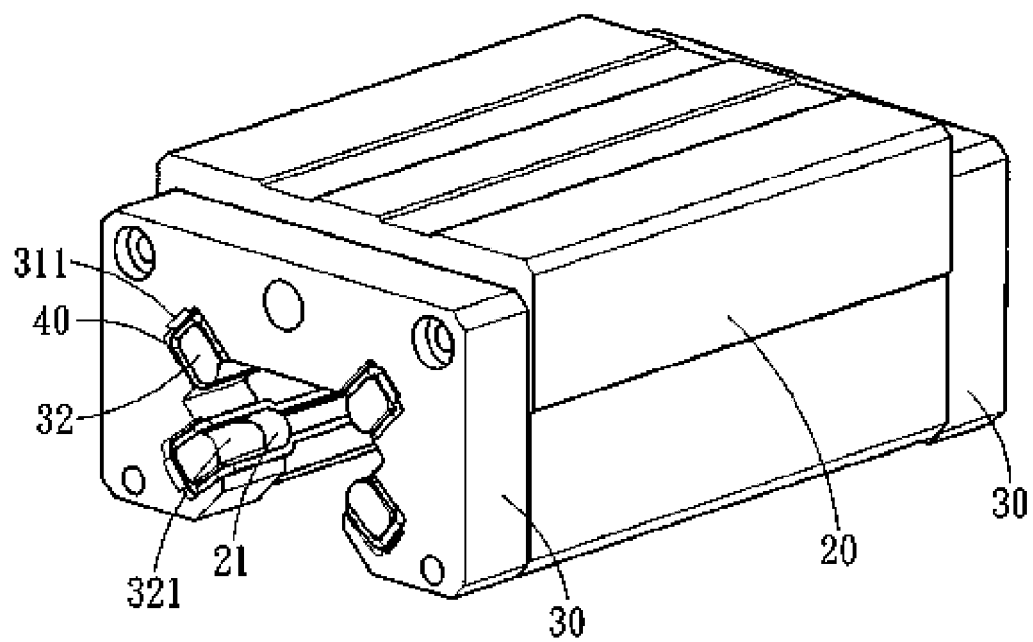
FIG. 5 is an assembly view of the present invention.
Figure 6:
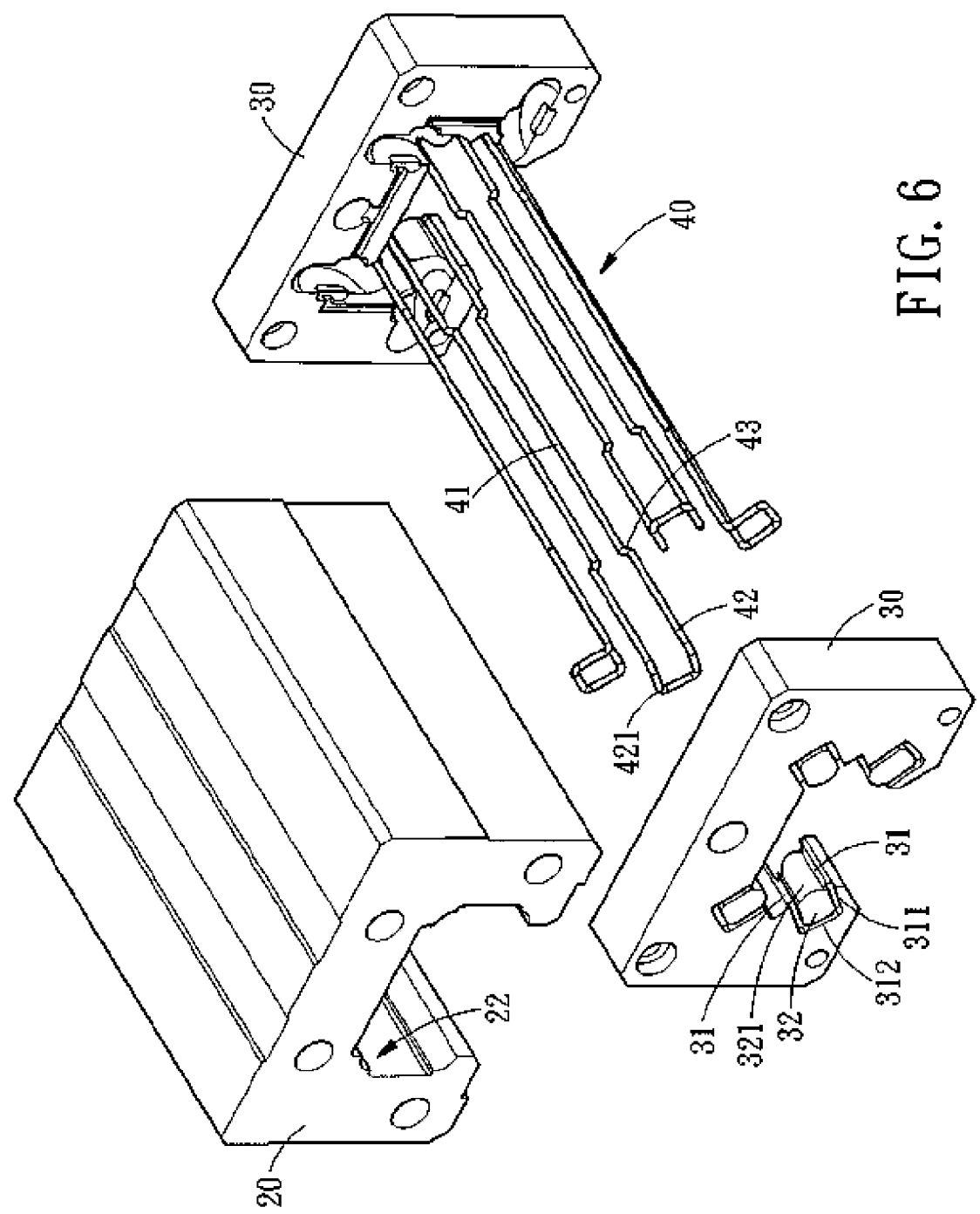
FIG. 6 is an exploded view of the present invention.
Figure 7:
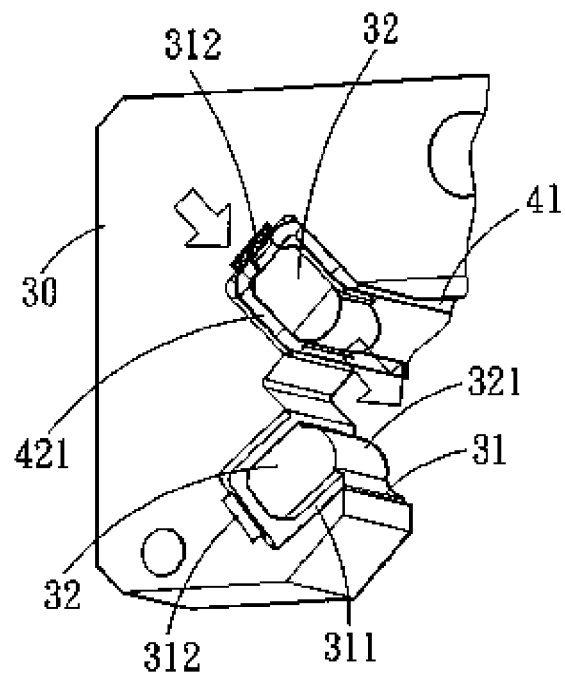
FIG. 7 is an illustrative view in accordance with the present invention of showing a preferable method of disassembling the steel wire retainer.

The foregoing, and additional objects, features and advantages of the present invention will become apparent from the following detailed description of preferred embodiments thereof, taken in conjunction with the accompanying FIGS. 4-7.

A steel wire retainer for a sliding block in accordance with the present invention comprises a sliding block 20, two end caps 30 and four steel wire retaining members 40.

The sliding block 20 is formed in its inner surface with four rolling grooves 22 along which the balls 21 roll.

The two end caps 30 are disposed at both ends of the sliding block 20, and each of the end caps 30 is defined with four locking grooves 31 to be aligned with the four rolling grooves 22 of the sliding block 20 (the two end caps 30 are oppositely arranged). In each of the locking grooves 31 is formed a locking section 311 that is vertical to the axis of the rolling grooves 22 of the sliding block 20. A pushing block 32 having an arc-shaped protruding end 321 is formed between the locking grooves 31, and a cavity 312 is defined beside the locking section 311 of the locking groove 31 for the user's finger.

The four steel wire retaining members 40 each is a frame formed by equal-diameter steel wire, and the respective steel wire retaining members 40 are shaped for mating with the locking grooves 31 of the end caps 30. Each of the steel wire retaining members 40 includes a mid restraining portion 41 and two retaining portions 42 at both sides thereof. Each of the retaining portions 42 is formed at its end with a vertical hook 421 for engaging with the locking section 311 of the locking grooves 31, and the steel wire at the restraining portion 41 is folded inward to form a reinforced folding portion 43. The steel wire retaining members 40 are engaged in the locking grooves 31 of the end caps 30 in such a manner that the hook 421 is hooked to the locking section 311 of the end caps 30.

Figure 8:
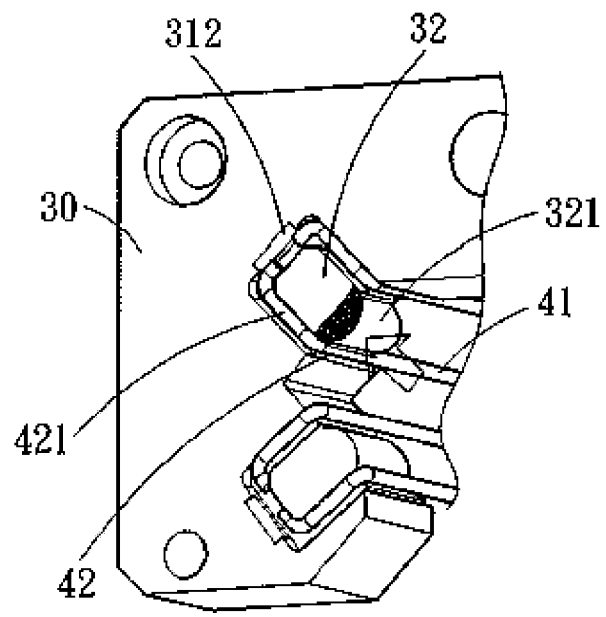
FIG. 8 is an illustrative view in accordance with the present invention of showing a preferable method of assembling the steel wire retainer.
Figure 9:
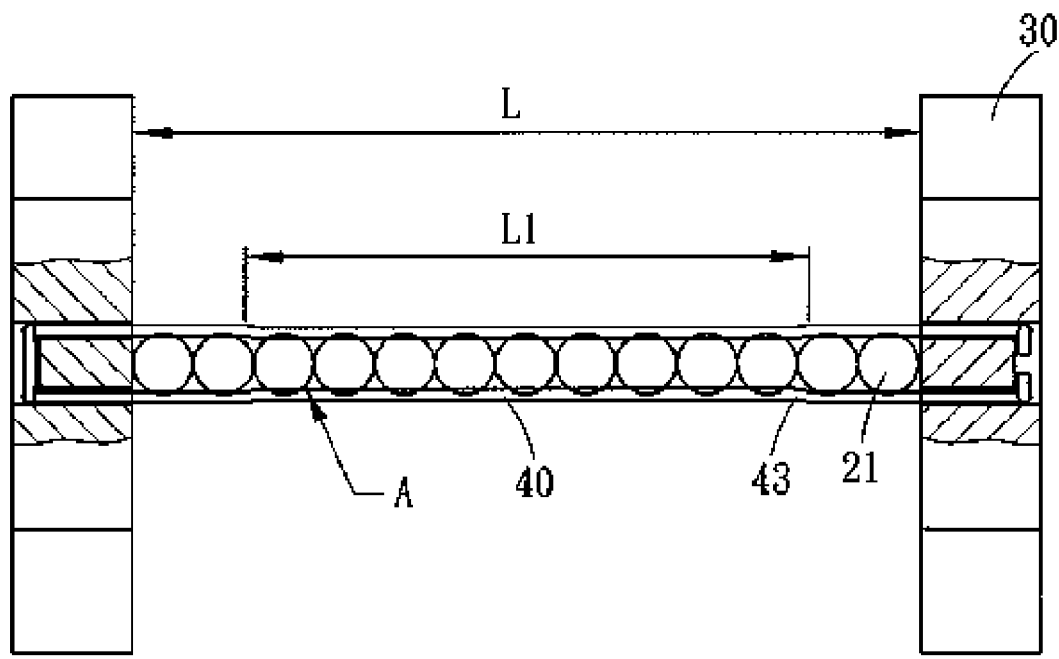
FIG. 9 is an illustrative view of illustrating the size of the end caps and the steel wire retaining member.

For a better understanding of the embodiment, its operation and function, reference should be made to FIGS. 8 and 9.

The four steel wire retaining members 40 are shaped correspondingly to the locking grooves 31 of the end caps 30, the design of the pushing block 32 in the locking grooves 31 allows the hook 421 of the steel wire retaining members 40 to deform and pass through the arc-shaped protruding end 321 of the pushing block 32 easily, enabling the steel wire retaining members 40 to be engaged in the locking grooves 31 of the end caps 30 in such a manner that that the hook 421 is hooked to the locking section 311 of the end caps 30. As a result, the restraining portion 41 of the respective steel wire retaining members 40 will cooperate with the rolling grooves 22 of the sliding block 20 to form a ball rolling path, achieving the fundamental function of preventing the disengagement of the balls 21.

Alternatively, the locking section 311 also can be formed on the sliding block 20 for being hooked by the hook 421 of the steel wire retaining members 40. It is important that the steel wire at the restraining 41 is folded inward to form a reinforced folding portion 43, the restraining portion 41 of the respective steel wire retaining members 40 will cooperate with the rolling grooves 22 of the sliding block 20 to form a ball rolling path, plus the reinforced folding portion 43 can effectively improve the deformation tolerance of the steel wire retaining members 40. Hence, the steel wire retaining members 40 can satisfy various sized design without worrying about that the deformation tolerance of the steel wire retaining members 40 will be decreased if the rolling path is too long. Therefore, the steel wire at the restraining 41 is folded inward to form a reinforced folding portion 43, such design can provide an effect of preventing the disengagement of the balls 21 and stabilizing the operation.

Figure 10:
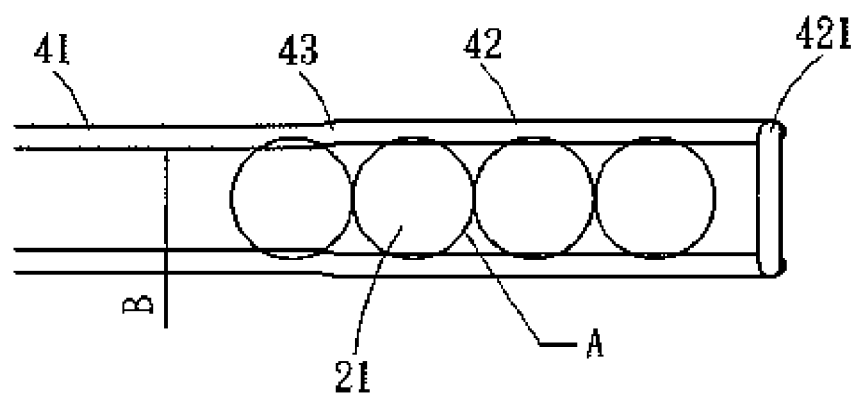
FIG. 10 is an illustrative view of illustrating the size of the balls and the steel wire retaining member.

Finally, in view that the ratio between the diameter and the length of the steel wire retaining member 40 will affect the flexibility and the support strength of the steel wire retaining member 40, therefore, the reasonable value of the reinforced folding portion 43 can be obtained from the following formulas, with reference to FIGS. 9 and 10:

The active length of the steel wire retaining member 40 is: L

The length of the reinforced folding portion 43 is L1, $0 \leq L1 \leq L$, where the symbol "$\leq$" means "less than" or "equal to".

Diameter of the balls 1 is A, the width of the reinforced folding portion 43 is B, $0 \leq B < A$;

A preferable formula is:

$$4A < (L-L1) < 8A$$

Another preferable formula is:

$$0.75A < B < 0.85A$$

As mentioned above, the innovative design of the present invention includes the locking section on the sliding block and the plurality of steel wire retaining members. The steel wire retaining members each has a hook formed on the retaining portion thereof for hooking the locking section of the sliding block. The restraining portion of the respective steel wire retaining members will cooperate with the rolling grooves of the sliding block to form a ball rolling path, and the restraining portion of the respective steel wire retaining members is formed with a plurality of reinforced folding portions. The simple, low cost and easily assembled steel wire retaining members have sufficient support strength and are suitable for various sized sliding blocks and can make the linear transmission apparatus operate stably.

While we have shown and described various embodiments in accordance with the present invention, it should be clear to those skilled in the art that further embodiments may be made without departing from the scope of the present invention.

What is claimed is:

1. A steel wire retainer for a sliding block being arranged correspondingly to rolling grooves of the sliding block, the steel wire retainer is characterized in that:

the sliding block is formed with a plurality of locking sections;

a plurality steel wire retaining members each includes a mid restraining portion and two retaining portions formed at both sides thereof, each of the retaining portions is formed at its end with a hook for engaging with the locking section of the sliding block, and each of the steel wire retaining members at the restraining portion is folded inward to form a reinforced folding portion, the hook of the steel wire retaining member is hooked to the locking section of the sliding block, and the restraining portion of the respective steel wire retaining member cooperates with the rolling grooves to form a ball rolling path.

2. The steel wire retainer for a sliding block as claimed in claim 1, wherein the rolling elements are balls or rollers.

3. The steel wire retainer for a sliding block as claimed in claim 1 further comprising two end caps, wherein:

the sliding block is formed in its inner surface with rolling grooves for rolling elements;

the two end caps are fixed at both ends of the sliding block, each of the end caps is defined with locking grooves, in each of the locking grooves is formed said locking section that is vertical to an axis of the rolling groove of the sliding block; and the steel wire retaining members each is a frame formed by equal-diameter steel wire, and the respective steel wire retaining members are shaped for mating with the locking grooves of the end caps, the hook is vertically formed at the end of the respective retaining portions for engaging with the locking section.

4. The steel wire retainer for a sliding block as claimed in claim 3, wherein the rolling elements are balls or rollers.

5. The steel wire retainer for a sliding block as claimed in claim 3, wherein a cavity is defined beside the locking section of the locking groove for the user's finger.

6. The steel wire retainer for a sliding block as claimed in claim 5, wherein the rolling elements are balls or rollers.

7. The steel wire retainer for a sliding block as claimed in claim 3, wherein an arc-shaped protruding end is tapered formed between the locking grooves of the end cap.

8. The steel wire retainer for a sliding block as claimed in claim 7, wherein the rolling elements are balls or rollers.

9. The steel wire retainer for a sliding block as claimed in claim 7, wherein a cavity is defined beside the locking section of the locking groove for the user's finger.

10. The steel wire retainer for a sliding block as claimed in claim 9, wherein the rolling elements are balls or rollers.

* * * * *